March 13, 1951 R. E. BORCHARDT 2,544,652
CUTTER SHARPENING MACHINE
Filed Aug. 14, 1948 4 Sheets-Sheet 1
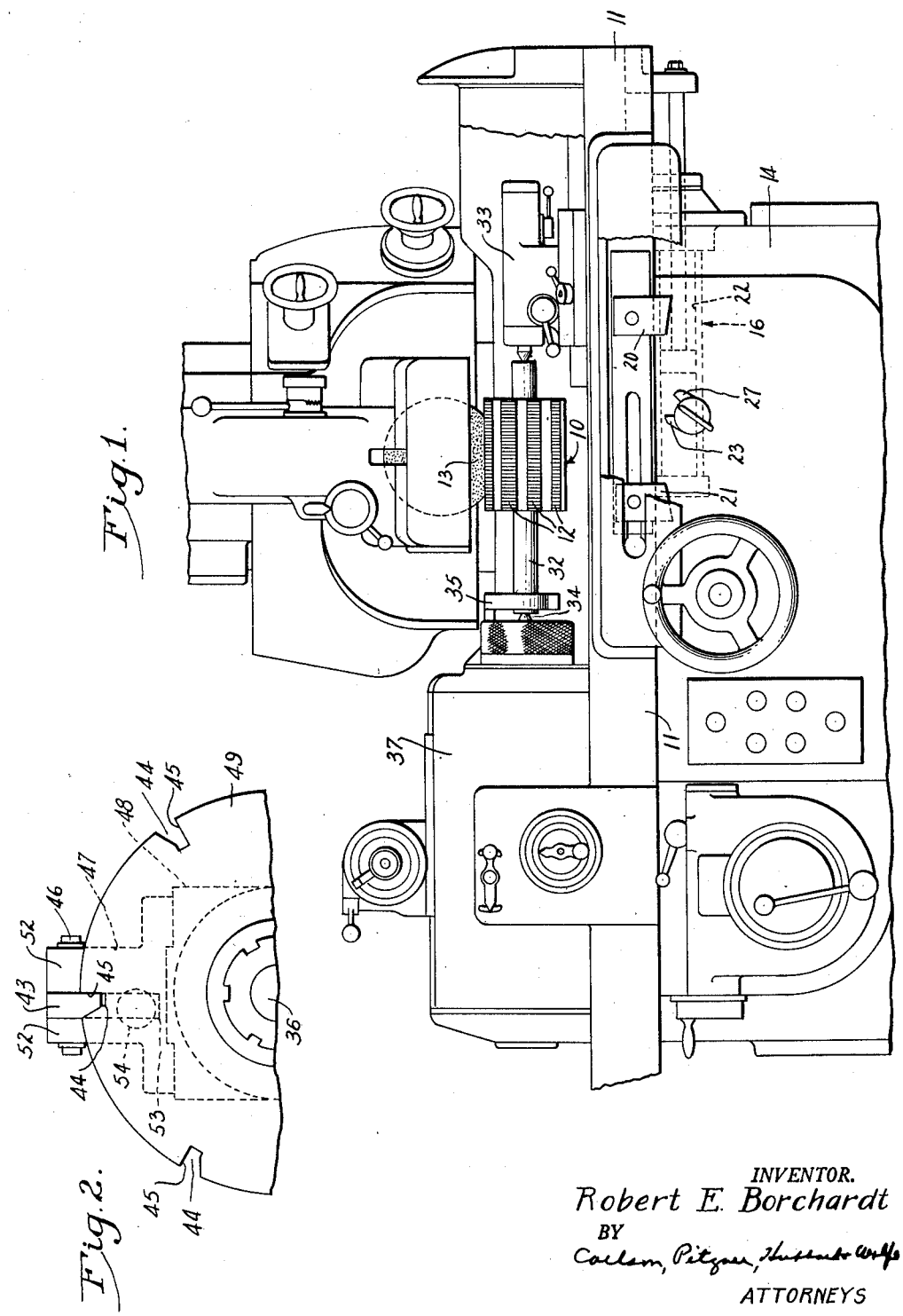
INVENTOR.
Robert E. Borchardt
BY
Carlson, Pitzner, Hubbard Wolfe
ATTORNEYS

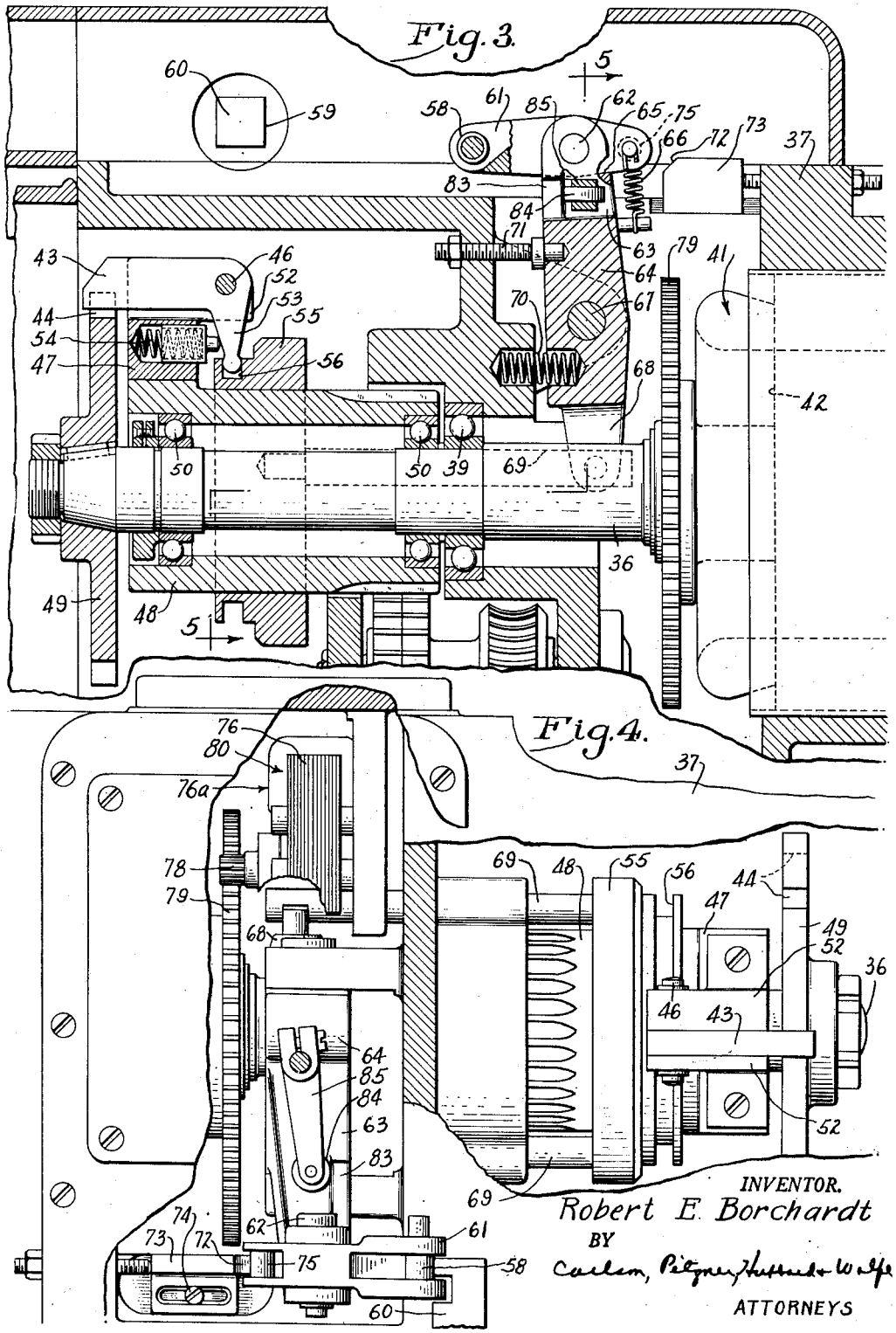

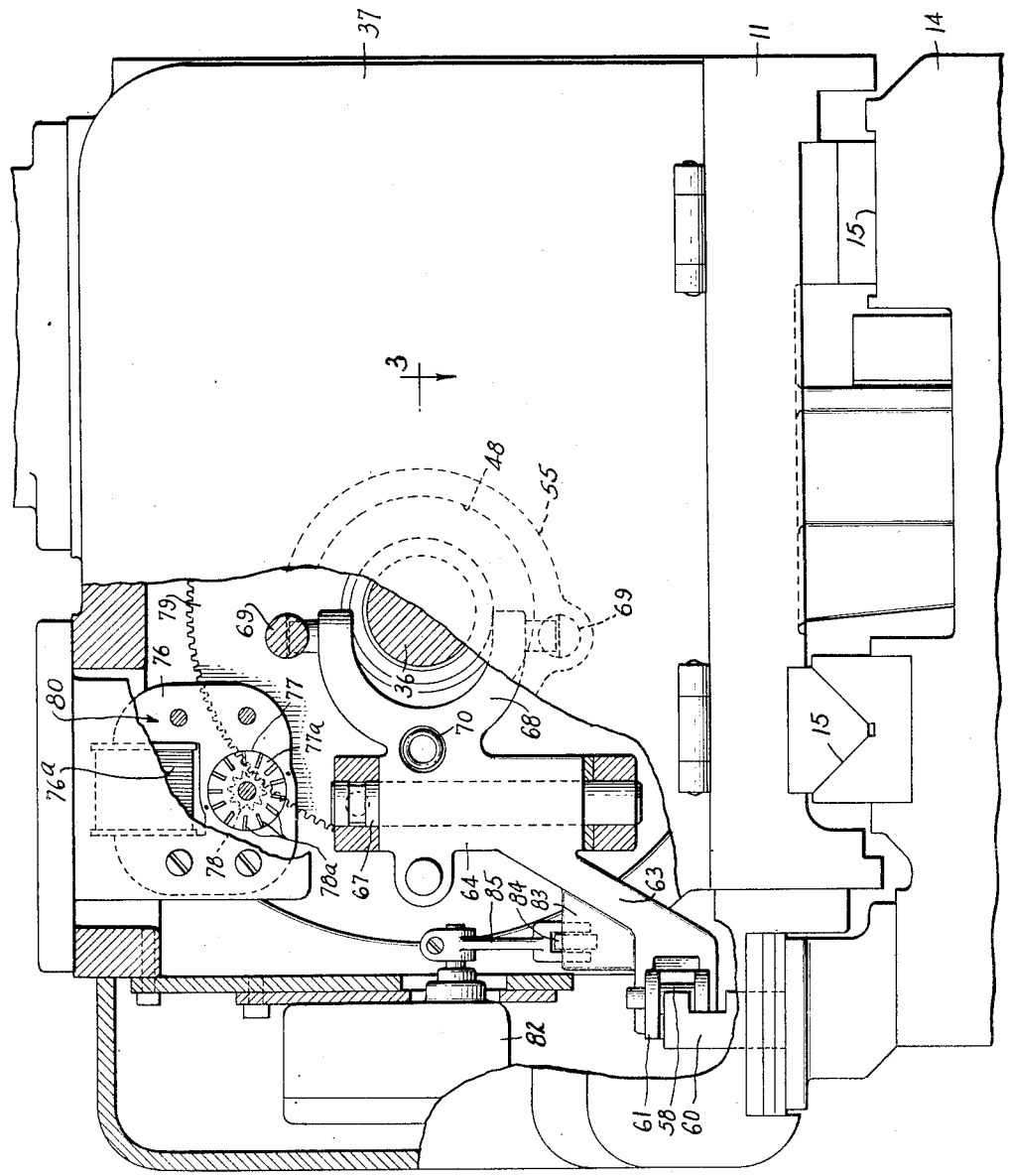

INVENTOR.
Robert E. Borchardt
BY
ATTORNEYS

Patented Mar. 13, 1951

2,544,652

UNITED STATES PATENT OFFICE 2,544,652

CUTTER SHARPENING MACHINE

Robert E. Borchardt, Rockford, Ill., assignor to Barber-Colman Company, Rockford, Ill., a corporation of Illinois Application August 14, 1948, Serial No. 44,353

4 Claims. (Cl. 51—216)

This invention relates to machines for sharpening the angularly spaced teeth of rotary cutters in successive reciprocations of the cutter back and forth across the face of a grinding wheel. After each reciprocation and while the cutter is out of engagement with the wheel, it is indexed to bring the next tooth into grinding position. In such a machine, the indexing motion may be effected by an electric torque motor which becomes effective to turn the cutter spindle as soon as the latter is released.

The primary object of the present invention is to incorporate in a machine of the above character a novel means for limiting the speed of the indexing motor so as to minimize the shocks incident to stopping the spindle in each new position.

A more detailed object is to utilize for this purpose an electrically controlled device which exerts on the spindle a frictionless drag which may be varied in magnitude as desired.

Other objects and advantages of the invention will become apparent from the following detailed description taken in connection with the accompanying drawings, in which Figure 1 is a front elevational view of a cutter sharpening machine embodying the novel features of the present invention.

Fig. 2 is a fragmentary end view of part of the indexing mechanism.

Fig. 3 is a fragmentary sectional view taken substantially along the line 3—3 of Fig. 5.

Fig. 4 is a fragmentary rear view of the spindle indexing mechanism with the housing thereof broken away and shown in section.

Fig. 5 is a section taken along the line 5—5 of Fig. 3.

Figure 6:
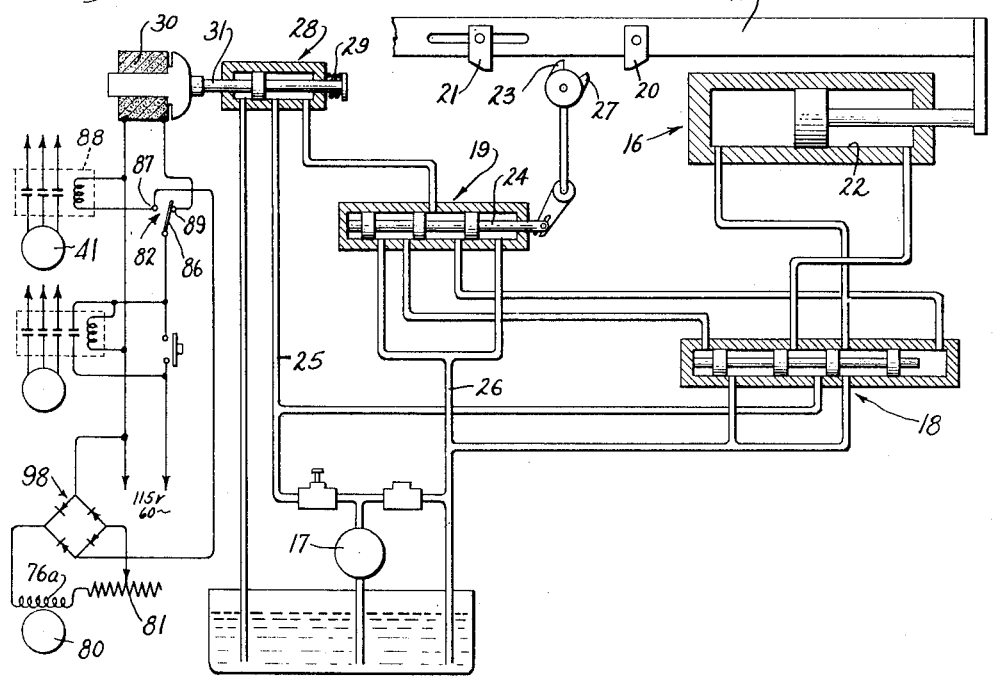
Fig. 6 is a schematic view and hydraulic and electric circuit diagram.

In the machine shown in the drawings for purposes of illustration, sharpening of the cutter such as a gear hob 10 is effected during a series of reciprocations of a table 11 between each of which the cutter is indexed to bring a succeeding row of teeth 12 into operative association with the conical face of a grinding wheel 13 which is positioned to engage the tooth faces along the desired plane. The grinding wheel is mounted adjustably above the table which is supported on the machine bed 14 and slides back and forth on ways 15 thereon. Herein, such reciprocation is effected by a fluid motor 16 (Fig. 6) the energization of which from a source 17 of pressure fluid is controlled in the usual way by a relay valve 18 which in turn is actuated by fluid pressure controlled by a reversing valve 19 adapted to be shifted between opposite limit positions by dogs 20 and 21, one of which is adjustable along the table.

With the parts positioned as shown, high pressure fluid is being admitted to the right-hand end of the cylinder 22 to advance the table to the left. As the table approaches the end of its left stroke, the dog 20 engages a lug 23 to shift the slide 24 of the reversing valve to the right and reverse the connections between the cylinder and the high and low pressure lines 25 and 26. The table then moves to the right until the dog 21 encounters the lug 27 and shifts the valve slide 24 back to the position shown in Fig. 6 thereby again reversing the connections to initiate movement of the table to the left.

To disable the table actuator under certain conditions to be described later, the flow of pressure fluid to the reversing valve is controlled by a valve 28 whose member is urged by a spring 29 in a direction to interrupt the fluid flow through the supply line 25. When a solenoid 30 is energized, the valve member 31 is drawn to the left as shown in Fig. 6 thereby opening the supply line 25.

The cutter to be sharpened is keyed to a horizontal arbor 32 disposed parallel to the table motion and supported at one end on a tailstock 33 on the right-hand end of the table 11. The other end of the arbor is supported by the center 34 (Fig. 1) and coupled by a drive dog 35 to a spindle 36 which projects through a headstock frame 37 and is journaled in bearings 38 and 39 (Figs. 3 and 5), the headstock being secured to the left-hand end portion of the table 11.

Power for turning of the spindle 36 to advance the cutter step by step and present the successive rows of the teeth 12 to the grinding wheel 13 is derived from an electric torque motor 41 (Figs. 3 and 6) whose rotor 42 is keyed to the spindle and whose stator is secured in a cylindrical inner end portion of the headstock housing. The extent of the indexing movement is determined by entry of a latch dog 43 (Figs. 2, 3 and 4) into the outwardly opening peripheral notches 44 around the periphery of a plate or disk 49 keyed to the outer end of the spindle 36. The trailing walls 45 of the notches are spaced accurately to correspond to the angular spacing of the teeth 12 on the cutter to be sharpened and the dog 43 is adapted to seat closely in the roots of the notches so that the cutter is positioned precisely when the dog is seated in a notch.

The dog 43 is pivoted on a crosspin 46 (Figs.

2, 3, and 4) mounted on the outer end of an arm 47 on a sleeve 48 rotatably supported through bearings 50 on the spindle 36. For the purpose of this application, the sleeve may be considered as stationary so as to hold the latch dog 43 in a fixed angular position.

The latch dog 43 is disposed between and laterally supported by lugs 52 and an inwardly projecting arm 53 thereon is urged by a spring 54 in a direction to swing the dog inwardly and thus cause it to enter the next notch 44 presented thereto in the turning of the index plate 49 following withdrawal of the dog to initiate an indexing movement. Such withdrawal is effected by outward axial shifting of a ring 55 (Figs. 3 and 4) loose on the sleeve 48 and having a groove 56 in which the inner rounded end of the latch arm 53 rides.

Shifting of the ring 55 to withdraw the latch dog and permit indexing of the cutter is effected when the table approaches the limit of its return or left-hand stroke. To this end, a trip roller 58 (Figs. 3 to 6) is mounted on the headstock to move with the table and is normally disposed as shown in Fig. 3 in a position to encounter the inner face 59 of a post 60 rigid with and upstanding from the machine bed in the path of the roller. The roller is carried on the bifurcated end of a lever 61 pivoted at 62 intermediate its ends on the outer bifurcated end of the downwardly projecting arm 63 of a lever 64 which extends transversely of the table and carries a stop 65 against which the lever 61 is normally held by a spring 66 to locate the roller in a position to engage the post 60. Intermediate its ends, the lever 64 is fulcrumed on a vertical pin 67 on the headstock, and the other end of the lever is forked as indicated at 68 (Fig. 5) to straddle the spindle 36 and is connected rigidly by two rods 69 to opposite sides of the latch dog release ring 55. A compression spring 70 (Figs. 3 and 5) acting on the lever 64 urges the latter in the direction of retraction of the table and against a stop 71 (Fig. 3) which is adjustable to vary the position in the table stroke at which the trip roller 58 encounters the post 60.

After the trip roller 58 has engaged the stop surface 59 and caused the lever 64 to be swung far enough to withdraw the latch dog 43, the roller is shifted laterally of the table motion and allowed to pass the stop. This is accomplished by an incline 72 on a cam 73 (Figs. 3 and 4) positioned to engage a crosspin 75 on the lever 61 in the final retracting movement of the table and move the roller 58 inwardly. The cam is clamped against a part on the table and slotted to permit adjustment of the cam by a screw 74 (Fig. 4) to vary the point in the final table movement so that the cam becomes effective to release the blocked roller.

In accordance with the present invention, means is provided for limiting the speed attained by the indexing motor 41 when it becomes effective so as to minimize the shock and impact incident to stopping the spindle and the parts thereon when the dog 43 drops into the next notch on the index plate. This means acts to exert a magnetic drag on the motor and spindle and herein comprises an eddy current brake 80 having a stator 76 (Figs. 4 and 5) adapted to be energized by direct current such as the output of a rectifier 98 connected across an alternating current power source as shown in Fig. 6. The stator coacts with a suitable rotor 77 such as an iron cylinder 77ᵃ with copper inductor bars 78ᵃ. A pinion 78 on the rotor shaft meshes with a gear 79 on the spindle 36 to produce a substantial speed reduction (preferably 15 to 1) between the brake and motor shafts. The degree of energization of the brake coil 76ᵃ and therefore the magnitude of the resulting magnetic drag may be adjusted through a suitable rheostat 81.

Figure 7:
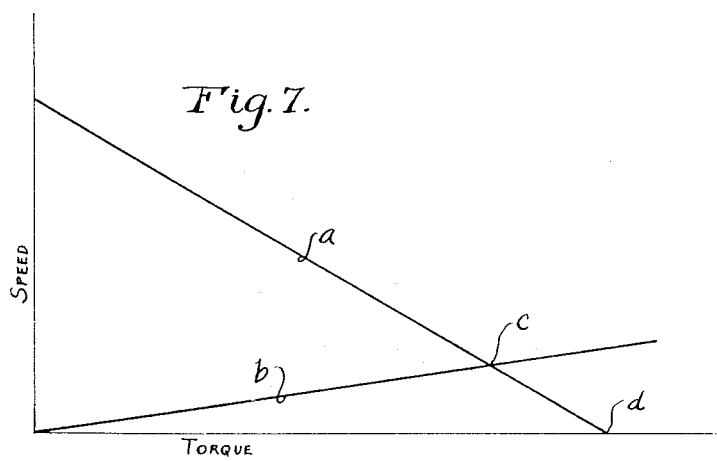
Fig. 7 shows the characteristic of the indexing motor.

The action of the eddy current brake 80 in limiting the speed of the motor is illustrated in Fig. 7 which shows at $a$ the speed torque characteristic of the motor 41 which preferably is specially constructed to make the curve $a$ substantially straight. The opposing torque developed by the eddy current brake increases progressively with the motor speed as indicated at $b$, the slope of the curve varying with the degree of energization of the stator winding 76ᵃ. The intersection $c$ of the curves determines the maximum speed which will be achieved by the cutter spindle. When the motor and brake are energized under the conditions described above, the full torque $d$ of the motor will be exerted to initiate rotation of the cutter spindle, the brake then being ineffectual. As the motor accelerates, the effectiveness of the brake increases and finally at the point $c$ a definite limit speed of the motor is established. It will be apparent that by varying the energization of the motor or the brake or both, the position of the point $c$ may be shifted as desired to minimize the impact on the parts under different operating conditions, particularly the length of the indexing movement.

Energization of the motor and also of the eddy current brake 80 is controlled by a switch 82 (Figs. 5 and 6) which is mounted on the table and is actuated in the initial movement of the lever 64 resulting from blocking of the roller 58 by the stop post 60. This is accomplished by a lug 83 on the lever positioned to engage a roller 84 on the arm 85 by which the switch is actuated as soon as the lever 64 starts to move.

The switch is of the single pole double throw type having a contact 86 (Fig. 6) which is adapted when its actuating arm 85 is released from the lug 83 to disengage a contact 87 and open the circuit through a relay 88 by which the motor 41 is controlled, the eddy current brake 80 being deenergized by opening of the same switch. At this same time, contacts 86 and 89 are engaged to connect the solenoid 30 across the power line. When the switch arm is actuated by the lug 83 as the latch dog 43 is withdrawn from a notch on the index plate, the contacts 87 and 86 engage deenergizing the solenoid 30 and completing the circuit for energizing the motor 41 and the brake 80.

I claim as my invention:

1. In a cutter sharpener, the combination of, a horizontal reciprocable table movable back and forth, means on said table supporting a cutter to be sharpened including a spindle rotatable about an axis paralleling the table motion, an index plate fast on said spindle and having an annular series of notches, a latch dog, means on said table supporting said dog for movement into and out of said notches, means yieldably urging said dog against said plate, an electric motor adapted when energized to turn said spindle, a rotary element, a speed reducing connection between said element and said spindle, and electromagnetic means coacting with said element when energized to exert a magnetic drag on the latter to limit the speed of said motor.

2. In a cutter sharpener, the combination of, a horizontal reciprocable table movable back and forth, means on said table supporting a cutter to be sharpened including a spindle rotatable about an axis paralleling the table motion, an index plate fast on said spindle and having an annular series of notches, a latch dog, means on said table supporting said dog for movement into and out of said notches, means yieldably urging said dog against said plate, an electric motor adapted when energized to turn said spindle, a rotary inductor element rotatable in unison with said spindle, electromagnetic means adapted when energized to coact with said element to exert a magnetic drag on the latter and thereby limit the speed of said motor, and means actuated by movement of said table as the latter approaches one limit of its travel to energize said motor and said electromagnetic means simultaneously.

3. In a cutter sharpener, the combination of, a horizontal reciprocable table movable back and forth, means on said table supporting a cutter to be sharpened including a spindle rotatable about an axis paralleling the table motion, an index plate fast on said spindle and having an annular series of notches, a latch dog, means on said table supporting said latch dog for movement into and out of said notches, means yieldably urging said dog against said plate, an electric motor adapted when energized to turn said spindle, a rotary inductor element rotatable in unison with said spindle, and electromagnetic means coacting with said element to exert a magnetic drag on the latter and thereby limit the speed of said motor.

4. In a cutter sharpener, the combination of, a horizontal reciprocable table movable back and forth, means on said table supporting a cutter to be sharpened including a spindle rotatable about an axis paralleling the table motion, an index plate fast on said spindle and having an annular series of notches, a latch dog, means on said table supporting said dog for movement into and out of said notches, means yieldably urging said dog against said plate, an electric motor adapted when energized to turn said spindle, and electromagnetic means adapted when energized to exert a frictionless drag on said spindle and thereby limit the speed of said motor.

ROBERT E. BORCHARDT.

REFERENCES CITED

The following references are of record in the file of this patent:

UNITED STATES PATENTS

| Number | Name | Date |
| --- | --- | --- |
| 1,973,329 | Bullows | Sept. 11, 1934 |
| 2,187,544 | Laessker | Jan. 16, 1940 |
| 2,442,635 | Bennett | June 1, 1948 |